(12) United States Patent
Ramsdell

(10) Patent No.: US 6,539,146 B1
(45) Date of Patent: Mar. 25, 2003

(54) METHOD AND ARCHITECTURE FOR MONITORING OPTICAL NODE HEALTH USING A MODULATED RETURN LASER DITHERING SIGNAL IN A BROADBAND NETWORK

(75) Inventor: Scott Ramsdell, Atlanta, GA (US)

(73) Assignee: Arris International, Inc., Duluth, GA (US)

( * ) Notice: Subject to any disclaimer, the term of this patent is extended or adjusted under 35 U.S.C. 154(b) by 0 days.

(21) Appl. No.: 09/721,432

(22) Filed: Nov. 22, 2000

Related U.S. Application Data

(60) Provisional application No. 60/167,094, filed on Nov. 23, 1999.

(51) Int. Cl.[7] .............................. G02B 6/28; H04J 14/02
(52) U.S. Cl. ......................................... 385/24; 359/125
(58) Field of Search ............................... 385/16, 24–30, 385/147; 359/125, 137, 167, 110, 123, 337, 300, 245; 370/216, 244, 250; 365/203, 189.01

(56) References Cited

U.S. PATENT DOCUMENTS

| | | | | |
|---|---|---|---|---|
| 5,321,656 A | * | 6/1994 | Kogan | 365/189.01 |
| 5,568,470 A | * | 10/1996 | Ben-Nun et al. | 370/238 |
| 6,020,990 A | * | 2/2000 | Brock | 342/368 |
| 6,097,533 A | * | 8/2000 | Atlas | 359/160 |
| 6,125,104 A | * | 9/2000 | Shiragaki et al. | 370/216 |
| 6,295,148 B1 | * | 9/2001 | Atlas | 359/125 |

* cited by examiner

Primary Examiner—Akm E. Ullah

(57) ABSTRACT

A method for an integrated status transponder using the modulation of a return laser dithering signal. This invention provides a method for transmitting an optical node monitoring signal corresponding to error detection parameters over an optical network extending from a transmission site to a receiver. A stabilizing RF signal and the optical node monitoring signal based on error detection parameters are modulated to generate an "intelligent" integrated signal. The integrated signal and the principal RF signal used for various services are sent in conjunction over an optical network to a receiving site. The integrated and principal RF signals are received from the optical network by a receiver. Start and device identification bits can be used to identify the monitoring signal and to specify a downstream destination device.

8 Claims, 5 Drawing Sheets

METHOD AND ARCHITECTURE FOR MONITORING OPTICAL NODE HEALTH USING A MODULATED RETURN LASER DITHERING SIGNAL IN A BROADBAND NETWORK

This application claims priority from U.S. provisional patent application Ser. No. 60/167,094, filed Nov. 23, 1999, entitled "INTEGRATED STATUS TRANSPONDER USING MODULATION OF RETURN LASER DITHERING SIGNAL."

FIELD OF INVENTION

This invention relates to the field of fiber optic communications and, more specifically, to monitoring the status of optical nodes. This invention also relates to hybrid fiber optic and coaxial cable networks.

BACKGROUND OF THE INVENTION

Oftentimes, in common fiber optic networks, especially cable television systems, it is preferable to monitor the status of a fiber optic transmission node (or optical node) downstream from the transmitter in order to detect transmission errors. This is especially advantageous within hybrid fiber optic and coaxial cable ("HFC") networks where optical nodes increase in volume closer to the residential neighborhood level to service relatively small numbers of homes passively with the coaxial cable portion of the network. By incorporating a monitoring system into a forward path broadband transmitter and the optical detection section of a broadband optical receiver, control signals can be sent to a remote optical receiver for more convenient monitoring.

The prior art discloses utilizing an RF transponder for monitoring the transmission health of a remote optical receiver. The monitoring signals from the RF transponder are sent downstream to an optical receiver along with a principal RF signal (carrying video, audio or data transmissions). While this configuration is useful for its intended purpose, the equipment necessary is often bulky and, therefore, physically constraining. RF transponders are power consuming relative to digital circuits and, because they utilize analog transmission techniques, are relatively unreliable. Further, the RF transponder monitoring system utilizes a downstream communications channel within the typical HFC spectrum that infringes upon the bandwidth that can be allocated for the main transmission signal. This bandwidth infringement adversely affects the efficiency of the network. The effect of such usage is the degradation of signal speed, quality and strength. Also, the complex synchronization of the monitoring signals within the downstream communications channel and the RF tuner and demodulator pairs necessary for synchronization further serve to make such systems complex and unreliable.

In addition to the RF monitoring signal, return laser dithering signals are also sent from the transmitter the nodes. A return laser dithering (periodically or randomly varying) signal is usually used in order to stabilize a lightly loaded laser and improve the left (linear) side of the noise power ratio (NPR) curve, however such a signal could be modified to carry intelligent information. In a typical ERDx return transmitter (single fiber for reverse transmission back to the hub or head end), laser diode dithering can be accomplished by the addition of pseudo-random noise below 5 MHz. Such a signal can be generated by a digital signal processor.

There is a need in the art for a more efficient way of monitoring the health of a remote optical receive site while eliminating the need for physically constraining, often unreliable and power consuming RF transponders.

There is also a need in the art for a method to allow all transmissions of status information to be performed outside of the bandwidth used for services on the HFC network. A monitoring system that could operate without infringing upon the bandwidth allocated for services would improve service transmission quality and efficiency.

There is a further need in the art for the elimination of the problem of complex synchronizing and collision detection that is required when RF transponders are used for transmitting status information.

Finally, there is a need in the art for a method to eliminate the use of a downstream communications channel within the HFC spectrum for the complex synchronization of monitoring signals. Such a method could increase reliability by eliminating the need for an RF tuner and demodulator.

SUMMARY

The present invention overcomes the above-described problems in the prior art by providing a method for implementing an integrated status transponder using modulation of the return laser dithering signal. The present invention provides a method for transmitting an optical node monitoring signal corresponding to error detection parameters relating to the reception of a principal RF signal over an optical network extending from a transmission site to a receiver. A principal RF signal is received at the transmission site. A stabilizing RF signal and an optical node monitoring signal based on error detection parameters relating to a primary RF signal are generated at the transmission site. The two signals are modulated to generate an integrated signal. The integrated signal and the principal RF signal are sent in conjunction over an optical network to a receiving site. The integrated signal and principal RF signal are received from the optical network by a receiver for verifying the integrity of the transmitting node.

Objects, features and advantages of the present invention will become apparent upon reading the following detailed description of the preferred embodiments of the invention, when taken in conjunction with the accompanying drawings and appended claims.

DETAILED DESCRIPTION

Figure 1:
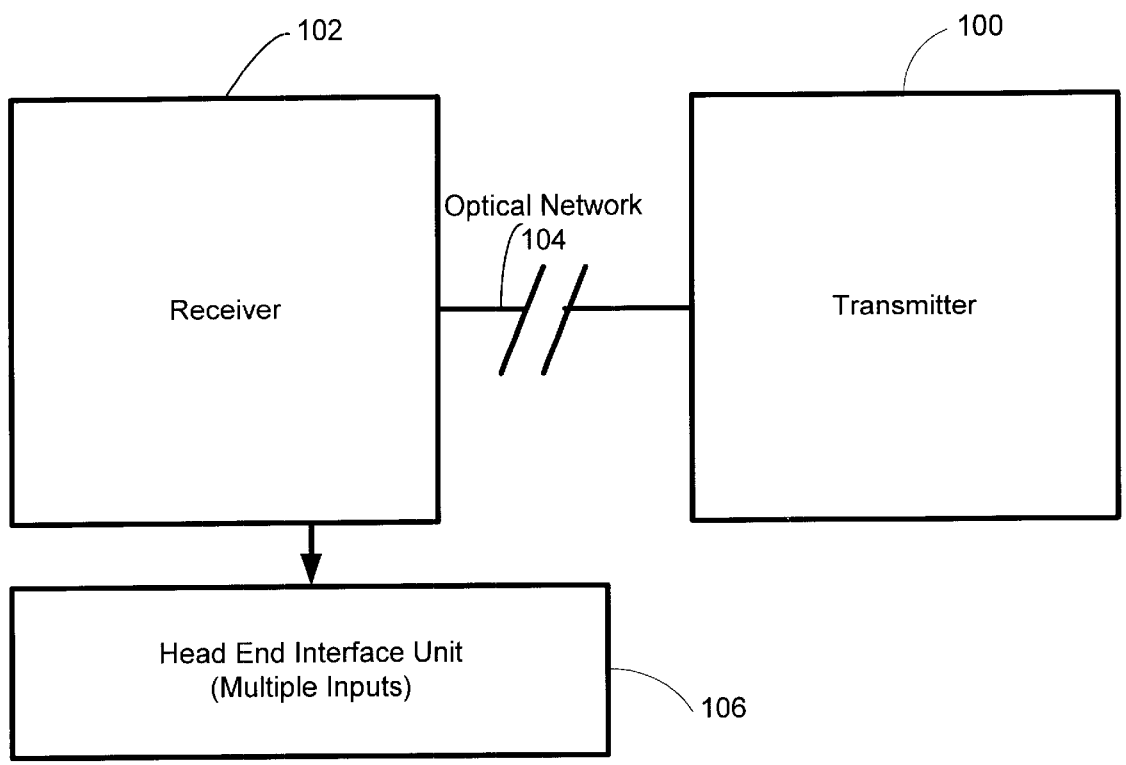
FIG. 1 is a system diagram that illustrates a high-level exemplary environment suitable for implementing various embodiments of the present invention which utilizes an integrated status transponder.

Referring now in detail to the drawings in which like numerals refer to like parts throughout the several views, FIG. 1 is a system diagram that illustrates a high-level exemplary environment suitable for implementing various embodiments of the present invention which utilizes an integrated status transponder. FIG. 1 shows the interrelationship between the elements of an optical communications system. The preferred embodiment utilizes an HFC network, but the present invention is useful for monitoring any optical communications network receiving principal RF signals, including those used for cable television, voice and data transmission signals. The optical communications system consists of an optical transmitter 100 for relaying a principal broadband signal received from an external source (such as a broadcast satellite). The optical transmitter 100 sends this principal broadband signal to a receiver 102 via an optical network 104, which consists of a fiber optic conduit. Although the preferred embodiment describes a return path receiver implementation, the present invention is equally effective utilizing a forward path configuration. The optical communications system also consists of a head end interface unit 106 that consists of multiple. monitoring inputs that supply monitoring data through a serial interface with the receiver 102. The head end interface unit 106 can include a user interface for displaying the monitoring data as well as multiple inputs to receive monitoring data from a plurality of receivers 102.

Figure 2A:
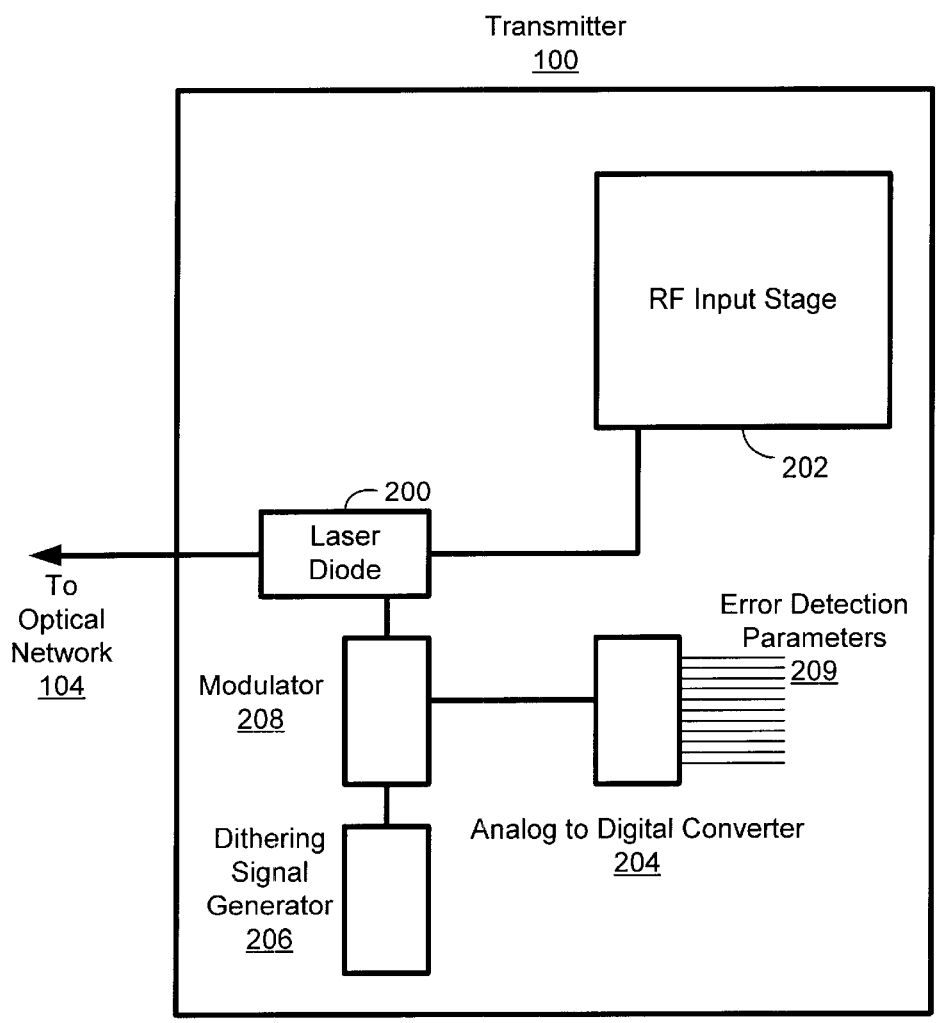
FIG. 2A is a block diagram that illustrates a high-level exemplary environment suitable for implementing various embodiments of the present invention which utilizes a return laser dithering signal for stabilizing a transmission laser.

FIG. 2A is a block diagram that illustrates a high-level exemplary environment suitable for implementing various embodiments of the present invention which utilizes a return laser dithering signal for stabilizing a transmission laser. FIG. 2A illustrates the configuration of the optical transmitter 100 employed by the present invention. The optical transmitter 100 is a return transmitter in this embodiment. The RF input stage 202 receives a principal broadband signal typically carrying a combination of video, audio or data signals using methods well known to those skilled in the art. Such broadband service signals can, be supplied by a satellite, a coaxial cable, another optical transmitter or by other transmission methods. It is possible for the principal broadband signal to utilize the entire bandwidth allocated for such transmissions because the present invention's monitoring and laser stabilization signals are combined and limited to bandwidth below 5 MHz by a method described in detail below.

Error detection parameters 209, defined as captured analog references of monitoring points within a broadband optical transmitter/receiver ("node"), are generated relating to the reception of the principal RF signal. The Error detection parameters 209 are converted to digital bit representations through an analog to digital process by an analog to digital converter 204. It is sufficient for the digital bit representations to be in the form of low baud rate data that can be transmitted at 300 baud or less. Such conversion methods are well known to those skilled in the art. The converted, data is then provided to a modulator circuit 208 to be combined with a dithering signal.

A dithering signal, or pseudo-random noise, is utilized in order to stabilize and improve the laser diode 200 transmission qualities for "lightly loaded" lasers. For the present invention, the dithering signal is supplied by a signal generator 206. Preferably, the signal generator 206 is implemented by a digital signal processor ("DSP") circuit, however other methods of generation can be equally effective and are well known to those skilled in the art. A blind (unsolicited by the destination) asynchronous streaming transmission method is used to send an "intelligent" integrated signal, performing both stabilization and monitoring data transfer functions, along with the principal broadband signal to the receiver 102. Because there is only one monitoring signal transmission device, complex synchronization and collision detection techniques are not necessary for implementing the present invention. The "intelligent" integrated signal is transmitted to the receiver outside of the bandwidth typically utilized by the principal RF signal for video, audio and data services. As stated above, in the preferred embodiment of the present invention, the integrated signal bandwidth will be below 5 MHz.

Figure 2B:
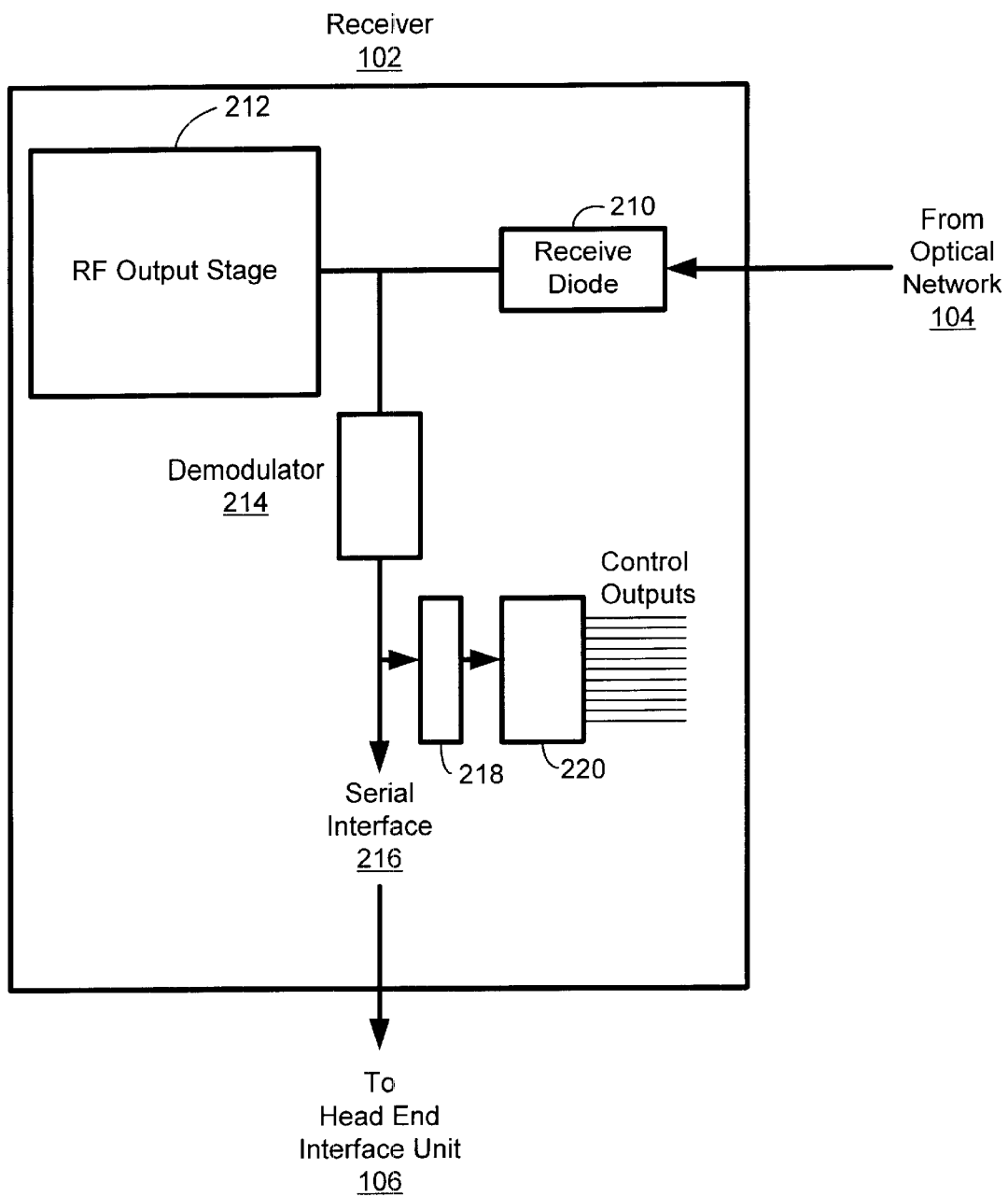
FIG. 2B is a block diagram that illustrates a high-level exemplary environment suitable for implementing various embodiments of the present invention which utilizes a demodulator.

FIG. 2B is a block diagram that illustrates a high-level exemplary environment suitable for implementing various embodiments of the present invention which utilizes a demodulator. The return path receiver 102 captures the integrated signal and demodulates it utilizing a demodulator circuit 214 back to digital bits prior to its cut-off between the optical receive diode 210 and the transmitter 100. The demodulated integrated signal reconstitutes the monitoring information about the remote transmitter 100. The monitoring signal bit stream can then be captured from a number of receivers 102 through serial connections 216 to a head end controller ("HEC") 106 that would interface the information back to a user interface utilizing common techniques. The information can then be utilized to assess the status of an optical node from a remote location.

Since a point-to-point relationship between the transmitter 100 and the receiver 102 exists, the blind transmission would be occurring at a rapid enough pace that the effect of any missed bits could be mitigated through software in the head end interface unit 106. For example, a variable could be set to force X number of consecutive same or near-same values for a parameter to be validated or averaged before updating a user interface. An alarm condition in this instance would not take long to determine, but traffic on a user interface system bus could be effectively and reliably managed, as could the polling rate with a large number of devices.

Figure 3:
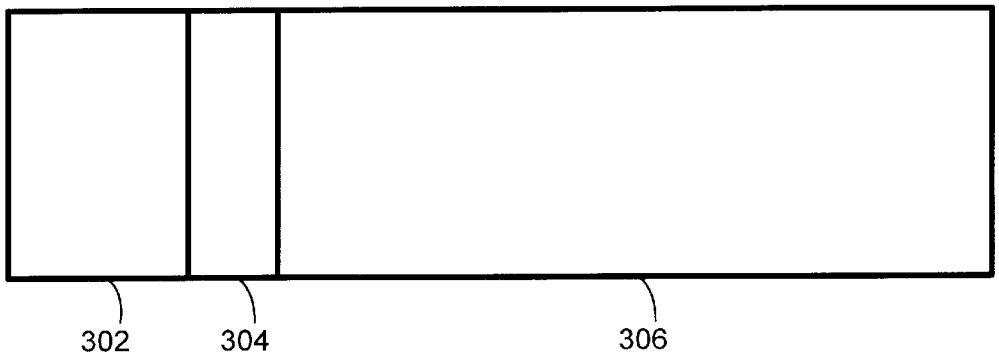
FIG. 3 is a block diagram that illustrates an optical transmission containing identification bits.

FIG. 3 is a block diagram that illustrates an optical transmission containing identification bits. FIG. 3 shows a bit diagram representation 300 of the monitoring bits and the principal broadband signal 306. At the start of each transmission sequence, a start identification pattern 302 is generated to say "this is the beginning" to a buffering device in the head end interface unit 106, hence creating a synchronization method without the need for additional circuitry. A device identification sequence 306 can be added to a forward path transmission to specify demodulation by a specific receiver in a multiple receiver network as described in detail below.

Figure 4:
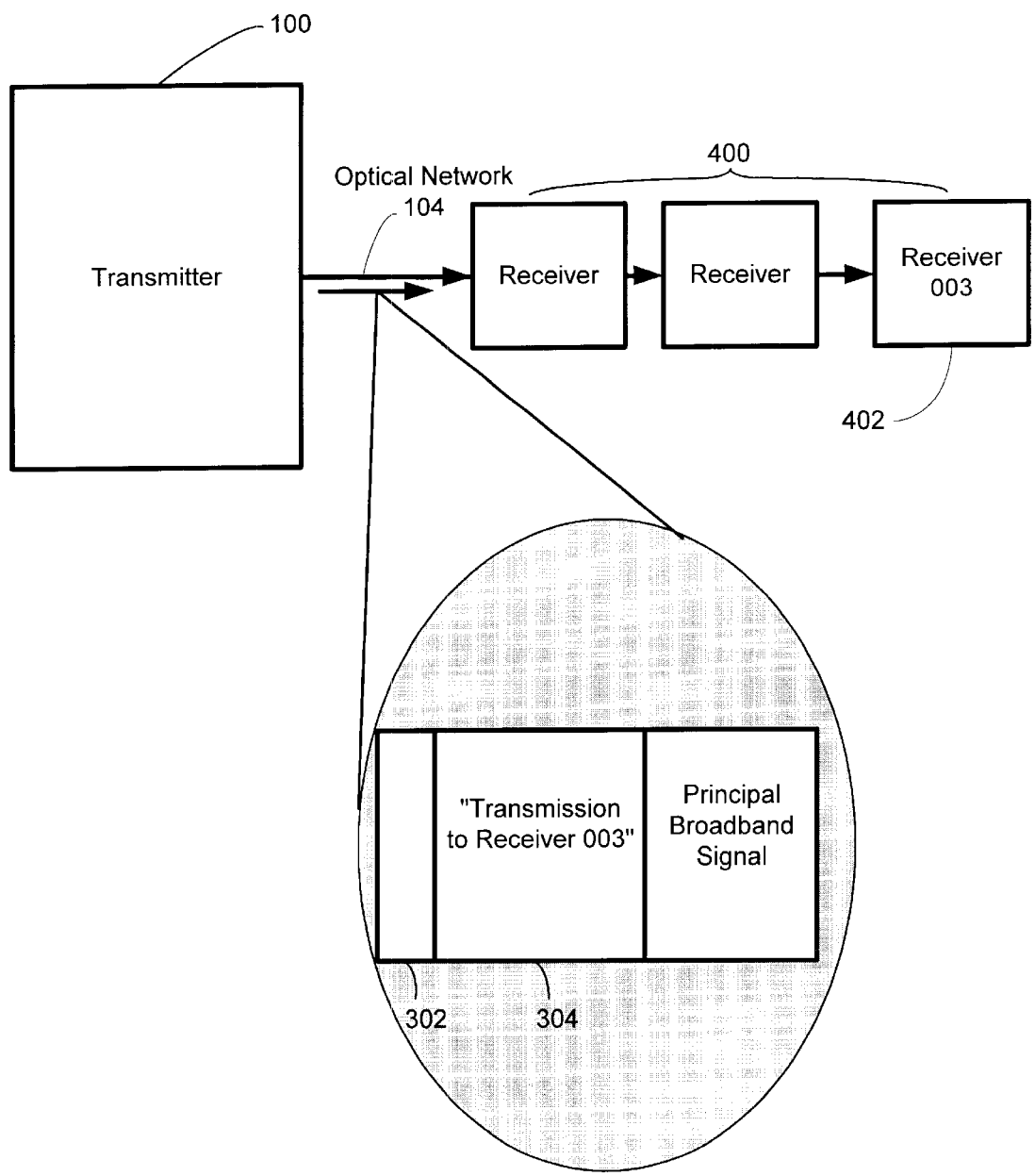
FIG. 4 is a block diagram that illustrates an alternative embodiment of the present invention utilizing a device identification sequence.

FIG. 4 is a block diagram that illustrates an alternative embodiment of the present invention utilizing a device identification sequence. If applied to the downstream (or forward path), a one to many relationship might exist between the transmitter 100 and successive receivers/repeaters 400. FIG. 4 shows how a device identification sequence 304 is utilized to send monitoring bits to a particular receiver in a multiple receiver network when a forward path configuration is employed. In such an instance, the present invention utilizes a device identification sequence 304, transmitted following the start identification bits 302, in order to send commands to a particular device along the optical network 104. Again, no synchronizing or collision detection methods are required for this implementation of the present invention. Incorporation of such ability can be done by the addition of a serial number PROM, or by a dip switch to the circuit. When the transmission is received by the intended receiver 402, the integrated signal is demodulated to reconstitute the monitoring information about the remote transmitter 100 and transferred serially to the head end interface unit 106 in the same method as described above. The information can then be utilized to assess the status of an optical node from a remote location.

The present invention has been described in relation to particular embodiments, which are intended in all respects to be illustrative rather than restrictive. Those skilled in the art will understand that the principles of the present invention may be applied to, and embodied in, various program modules for execution on differing types of computers and/or equipment, operating in differing types of networks, regardless of the application.

Alternate embodiments will become apparent to those skilled in the art to which the present invention pertains without departing from its spirit and scope. Accordingly, the scope of the present invention is described by the appended claims and supported by the foregoing description.

What is claimed is:

1. Method for transmitting an optical node monitoring signal corresponding to error detection parameters over an optical network extending from a transmission site to a receiving site, comprising:

receiving a principle RF signal;

generating an optical node monitoring signal based on error detection parameters relating to said reception of said principle RF signal;

generating a stabilizing RF signal at said transmission site;

modulating said stabilizing RF signal with said optical node monitoring signal to generate an integrated signal;

sending said integrated signal in conjunction with said principle RF signal over said optical network; and receiving said integrated signal in conjunction with said principle RF signal from said optical network at the receiver.

2. Method of claim 1, wherein a start identification sequence is utilized to send said integrated signal over said optical network.

3. Method of claim 1, wherein said integrated signal is transmitted outside of the bandwidth allocated for said principal RF signal.

4. Method of claim 1, wherein said integrated signal is demodulated at said receiver.

5. Method of claim 1, wherein there is a plurality of said receivers and a device identification sequence is utilized to send said integrated signal in conjunction with said principal RF signal over said optical network to at least one particular receiver out the plurality of said receivers.

6. An optical node monitoring signal transmitter for an optical network extending from a transmission site to a receiving site, comprising:

a first receiver for receiving a principle RF signal;

a signal generator for producing an optical node monitoring signal based on error detection parameters relating to said principle RF signal;

a signal generator for producing a stabilizing RF signal at said transmission site;

a modulator for combining said stabilizing RF signal with said optical node monitoring signal to produce an integrated signal;

an RF input device to receive a principle RF signal; and an optical transmission device to send said integrated signal in conjunction with said principle RF signal over said optical network.

7. The optical node monitoring signal transmitter of claim 6, wherein a second receiver receives said integrated signal in conjunction with said principle RF signal from said optical network.

8. The optical node monitoring signal transmitter of claim 6, wherein a second receiver receives said integrated signal outside of the bandwidth allocated for said principle RF signal.

* * * * *